Dec. 16, 1958  E. A. MARRYATT  2,864,644
CARGO HOOKS
Filed Sept. 30, 1957  4 Sheets-Sheet 1

INVENTOR
EARL A. MARRYATT
BY Gustav Drews
his ATTORNEY

Dec. 16, 1958 E. A. MARRYATT 2,864,644
CARGO HOOKS

Filed Sept. 30, 1957 4 Sheets-Sheet 2

INVENTOR.
EARL A. MARRYATT
BY Gusta Drews
his ATTORNEY

Dec. 16, 1958 E. A. MARRYATT 2,864,644
CARGO HOOKS
Filed Sept. 30, 1957 4 Sheets-Sheet 3
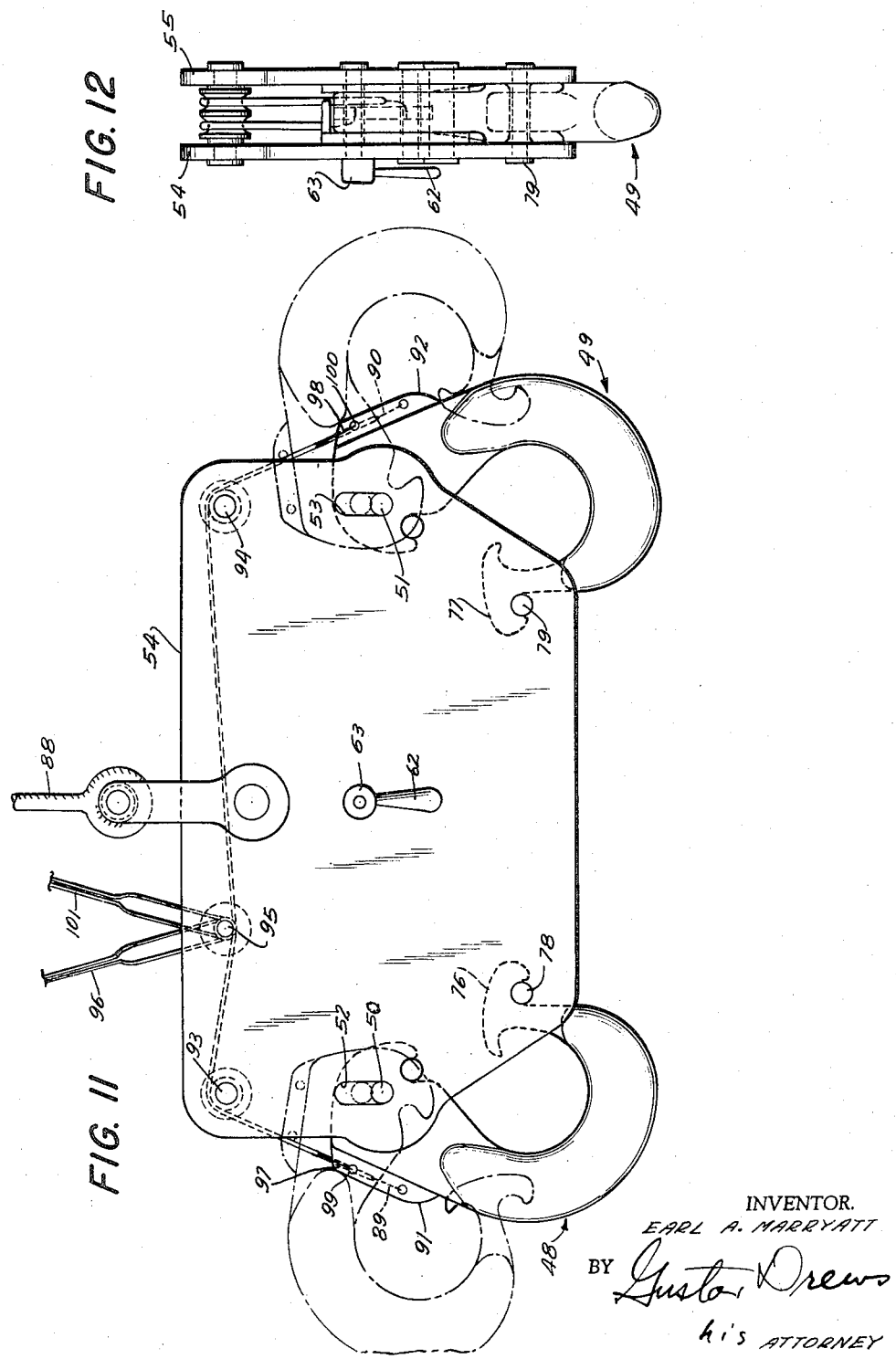
INVENTOR.
EARL A. MARRYATT
BY Gusta Drews
his ATTORNEY

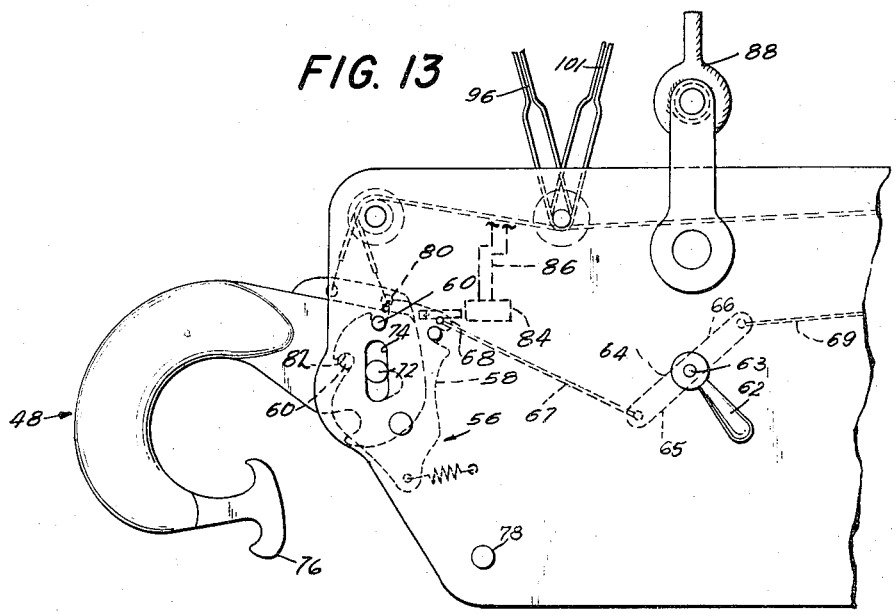

2,864,644

CARGO HOOKS

Earl A. Marryatt, Closter, N. J.

Application September 30, 1957, Serial No. 687,061

18 Claims. (Cl. 294—83)

This invention relates to cargo hooks in general, more especially to the type of cargo hook having a clevis secured to a lanyard and the load carrying hook pivotally connected to the clevis.

Among the objects of the present invention it is aimed to provide an improved cargo hook having a clevis, a load carrying hook pivotally connected to the clevis, and an intermediate anchoring device between the clevis and the load carrying hook for anchoring the hook in open or loading position thereby dispensing with the manual holding of the hook in open position during a loading operation, and which anchoring device in turn also anchors the hook in closed or load carrying position.

It is also an object of the present invention to provide an improved cargo hook having a clevis secured to a lanyard, a load carrying hook pivotally connected to the clevis, and an intermediate anchoring device consisting of a mousing plate fixed relative to the clevis, a mousing lock plate pivotally mounted on the clevis and a spring for urging the lock plate into position for locking the hook either in open or loading position or in closed or load carrying position.

These and other features, capabilities, and advantages of the invention will appear from the subjoined detailed description illustrated in the accompanying drawings, in which Fig. 1 is a side elevation of the cargo hook in closed or load carrying position.

Fig. 11 is a side elevation of a modification.

Fig. 12 is an end elevation of the modification illustrated in Fig. 11.

Fig. 13 is a fragmental elevation of the embodiment illustrated in Fig. 11 in open or loading position.

Fig. 14 is a fragmental elevation of the part illustrated in Fig. 13 in closed or lock plate position.

Fig. 15 is a fragmentary side elevation of a modification.

Figure 1:
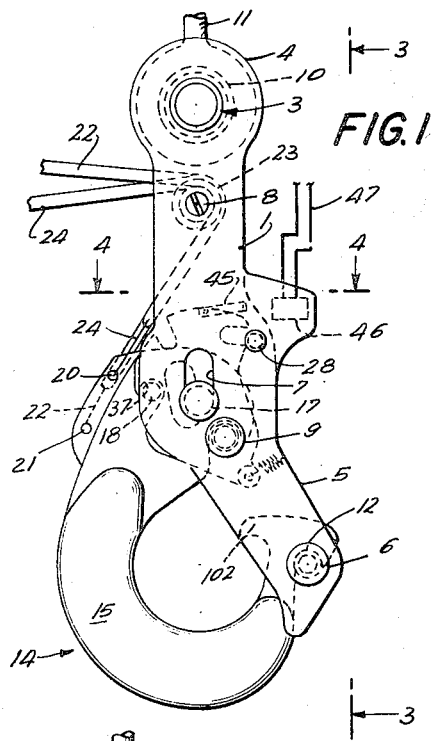

In the embodiment shown in Figs. 1–10 inclusive, there is illustrated a single cargo hook construction made according to the present invention consisting of two side bars 1 and 2 which may be composed of steel plate, a casting, or the like. These two plates are connected together by the pin 3 connecting the upper arms 4 of the bars to one another. At the lower ends of the arms 5 there is provided a second pin 6 connecting the lower arms together. About midway between the pins 3 and 6 each of the bars 1 and 2 are provided with a slot 7. Between the slots 7 of the bars 1 and 2 and the pin 3 there extends the pin 8. In turn between the slots 7 and the pins 6, the bars 1 and 2 are connected by the pin 9. On the pin 3 there is journalled the roller 10 to receive the end of the cable 11 preferably composed of steel wire or the like. On the pin 6 in turn, there is also journalled a spacer 12. The spacer 12 is intended to receive the hooked neck diminished end 13 of the cargo unit 14, the body 15 of which is enlarged and curved. The connecting end portion 16 of the unit 14 is diminished laterally and provided with a pin 17 which extends through the slots 7 in the bars 1 and 2. Extending from the sides of the diminished end portion 16 are provided the anchoring pins 18. From the diminished end portions 16 in turn extends the fin 19 provided with two openings 20 and 21. Extending through the opening 21 and connected to the fin 19 there is provided the lanyard 22 which extends up around the roller 23 journalled on the pin 8. Extending through the opening 20, a second lanyard 24 is secured to the fin 19, the second opening 20 being disposed nearer the opening 7 than the opening 21 is disposed. The second lanyard 24 similarly passes around the roller 23 and then with the lanyard 22 extends to the position of the operator of the unit. When the bars 1 and 2 with the hook unit 14 are in lock or load carrying position, that shown in Fig. 1, it has been found that when the anchoring device, hereinafter to be described, is released, a tug or pull on the lanyard 22 will enable moving the hook unit 14 into the open position, the position of the opening 21 relative to the pin 6 and the roller 23 enabling the lanyard 22 to swing the hook unit 14 in clockwise direction into the open position shown in Fig. 2.

Furthermore, when so moved into the open position the anchoring device, hereinafter to be described, will be in position to receive the pin 18 and anchor the hook unit 14 in the open position.

Figure 2:
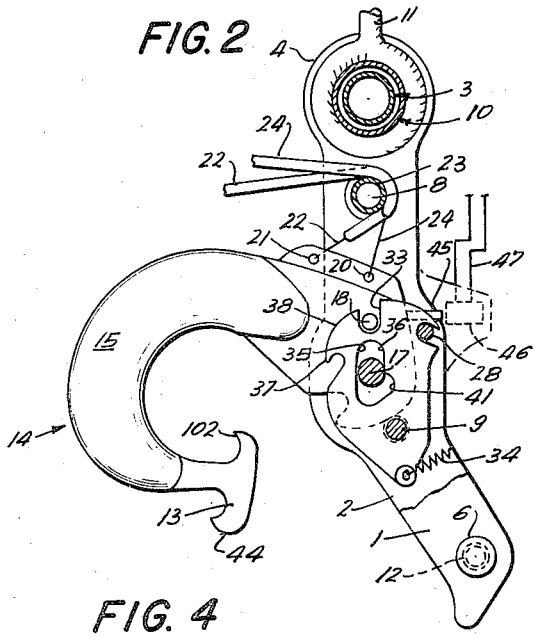
Fig. 2 is a side elevation of the same in open or loading position.
Figure 3:
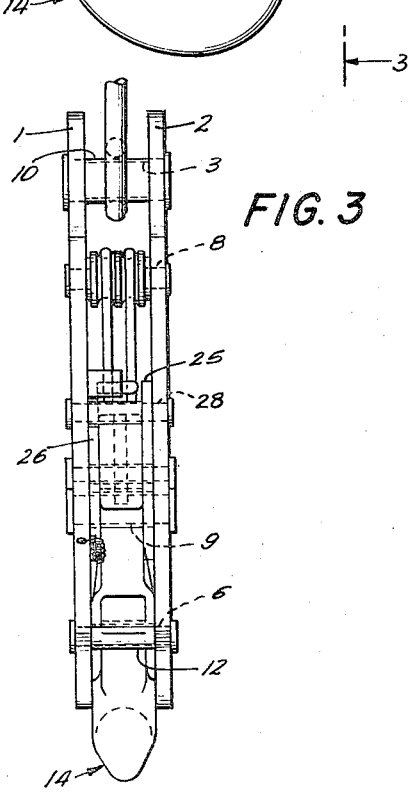
Fig. 3 is an end view on the line 3—3 of Fig. 1.
Figure 4:
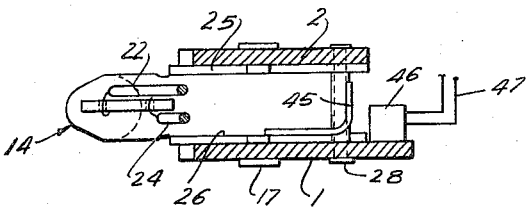
Fig. 4 is a transverse section on the line 4—4 of Fig. 1.

In turn when a tug or pull is exercised on the lanyard 24 after the hook unit 14 is locked in the open position shown in Fig. 2, then the position of the opening 20 relative to the roller 23 will enable the upward movement of the hook unit 14 out of locked position when the slots 7 in the bars 1 and 2 will enable the pin 17 to move upward with the hook unit 14 out of locked position and into position where by gravity the hook unit 14 will then automatically fall into its closed position, that shown in Fig. 1.

Figure 5:
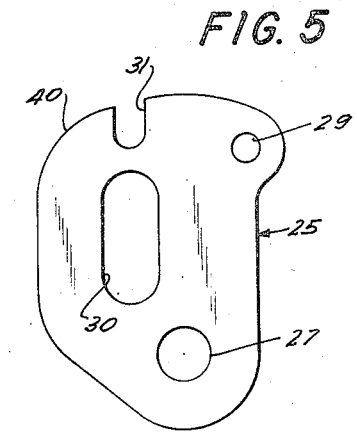
Fig. 5 is a side elevation of the fixed mousing plate.
Figure 6:
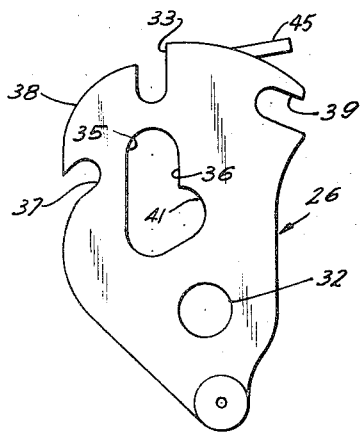
Fig. 6 is a side elevation of the mousing lock plate.
Figure 7:
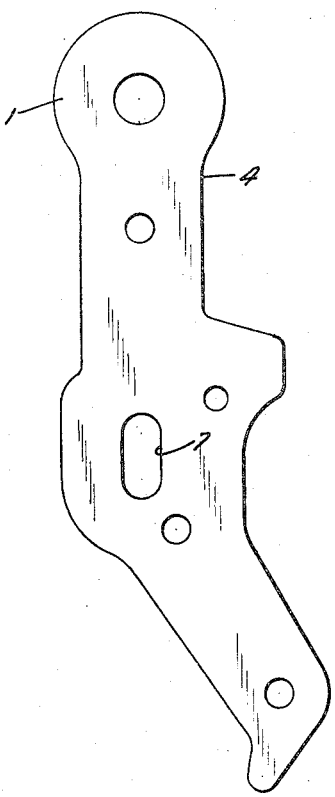
Fig. 7 is a side elevation of one of the side bars detached.
Figure 8:
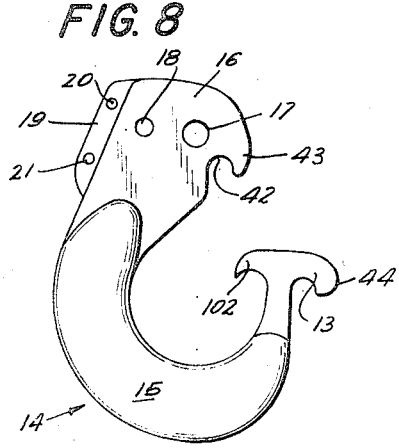
Fig. 8 is a side elevation of the hook unit separated from the side bars.
Figure 9:
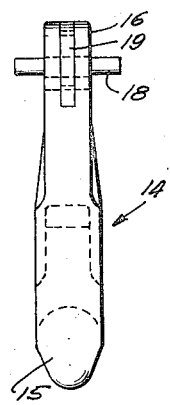
Fig. 9 is a rear elevation of the unit illustrated in Fig. 8.
Figure 10:
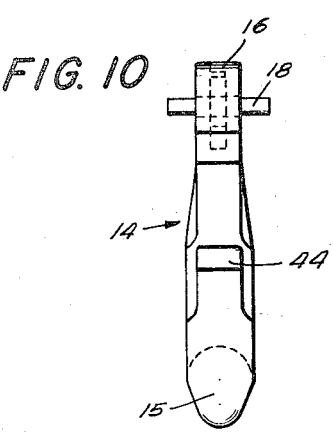
Fig. 10 is a front elevation of the unit illustrated in Fig. 8.

The anchoring device consists essentially of two plates 25 and 26 shown in Figs. 5 and 6 respectively. The plate 25 is fixed to the arms 1 and 2 by the pin 9 extending through the opening 27 in the plate 25 and the pin 28 extending through the arms 1 and 2 and through the opening 29 in the plate 25. The slot 30 in the plate 25 is in substantial alinement with the slots 7 in the bars 1 and 2. At the upper end of the plate 25 there is formed a recess 31 which receives the pin 18 of the hook unit to cooperate with the plate 26 in anchoring the hook unit 14 in the open position in Fig. 2, the slots 7 being formed to facilitate vertical movement of the pin 17 of the hook unit 14 when moving up and down in the slots 7 of the bars 1 and 2. The plate 25 in the present instance is disposed on the inside and adjacent to the bar 2, see Fig. 3, while the plate 26 is disposed on the inside of the bar 1 and engages the inner face of the same, see Fig. 3. The plate 26 has an opening 32 to receive the pin 9 about which pin 9, plate 26 is rockable. The plate 26 also has a recess 33 in substantial alinement with the recess 31 of the plate 25 to receive the pin 18 formed in the hook unit 14. The pin 18 as shown in Fig. 9 extends through the diminished portion 16 of the hook unit 14 projecting from the opposite faces of the portion 16 so that the end portions of the pin 18 projecting from the opposite faces of the diminished portion 16 may extend into the recesses 31 and 33 of the plates 25 and 26 when the plate 26 is rocked into position where its recess 33 is in alinement with the recess 31 of the plate 25. When the plate 26 is in substantial alinement with the plate 25, it is so positioned against the tension of the spring 34 connected at one end to the edge of the bar 1 and at the other end to the lower end of the plate 26, the pin 17 of the hook unit 14 moving into the upper portion 35 of the recess 36 in the plate 26. When the pin 17 rides in the upper portion 35 of the recess 36, the pin 18 will be moved out of the recess 37 and be at liberty to ride on the curved surface 38 of the plate 26 between the recess 37 and the recess 33. Furthermore, when the hook unit 14 is rocked into a position where the pin 18 alines with the recess 33, the hook unit 14 may descend where the pin 18 will drop into the recesses 31 and 33 of the plates 25 and 26 respectively. In this position of the hook unit 14, the recess 39 of the plate 26 will receive the pin 28. The recess 39, however, is merely formed to clear the pin 28 and otherwise performs no function. When it is desired to liberate the hook unit 14 from the open position shown in Fig. 2 and permit it to be swung into the lower closed position shown in Fig. 1, a tug or pull will be exercised on the lanyard 24 when through the connection of the lanyard 24 with the fin 19 through the opening 20, the diminished portion 16 of the hook unit will be raised so that the pin 18 will clear the recesses 31 and 33 of the plates 25 and 26 respectively and then due to the weight of the hook unit 14, the hook unit 14 will swing over and permit the pin 18 to ride on the curved faces 40 and 38 of the plates 25 and 26 until a pin portion 18 registers with the recess 37 whereupon due to the tension in the spring 34, the plate 26 will be rocked about the pin 9 and the recess 37 receive the pin 18 as shown in Fig. 1. The lateral recess portion 41 of the recess 36, see Fig. 2, will receive the pin 17 and thereby permit the plate 26 to rock from the position shown in Fig. 2 into the position shown in Fig. 1.

In this position, the hook unit 14 will not only be supported by the pin 17 resting in the lower ends of the recesses 7 of the bars 1 and 2 and by the lip 13 resting on the spacer 12 journalled on the pin 6 but also by the recess 42 in the diminished portion 16 of the hook unit 14 receiving the pin 9 and the inner face of the recess 42 of the diminished portion 16 thus resting on the pin 9. The lip 43 of the diminished portion 16 and the lip 44 of the hook portion 13 of the hook unit 14 will prevent the hook unit from leaving the bars 1 and 2 should the pin 17 be sheared. In this position furthermore, the pin 18 cooperating with the recess 37 of the plate 26 will anchor the hook unit in its closed or load carrying position, that shown in Fig. 1.

In order to then release the hook unit 14 from this anchored position with the pin 18, the plate 26 will be rocked against the tension of the spring 34. For this purpose the finger 45 is formed on the plate 26. If to be manually operated, it will only be necessary for the operator to engage the finger 45, move it to the right until the recess 37 clears the pin 18 and then swing the hook unit 14 to the left into the open or loading position, shown in Fig. 2. Should it be desired to rock the plate 26 by remote control, an electro magnet 46 may be positioned adjacent the finger 45 which electro magnet is connected by the wiring 47 to a remote distance preferably extending along the cable 11 to the position where the operator is located, where a source of current may be connected to the wiring 47 and a current established by the operator in the conventional way by operating a switch to energize the electro magnet 46 to attract the finger 45 and thereby rock the plate 26 about the pin 9.

In the embodiment shown in Figs. 11, 12, 13 and 14, two hook units 48 and 49 are provided with pins 50 and 51 respectively which travel in the vertical slots 52 and 53 of the plates 54 and 55. The slots 52 and 53 of the plates 54 and 55 depending upon the lengths of the plates 54 and 55 may be spaced a greater or less distance depending upon the type of load to be carried. It has been found that when an elongated unit is to be picked up by a crane such for instance as a steel beam, six foot or more in length, that the same can be better supported if it is engaged by a pair of cargo hooks instead of a single cargo hook. Anchoring plates such as the plates 25 and 26 of the embodiment illustrated in Figs. 1 and 2 may be used to advantage with the plates 54 and 55 except that the unit 56, Fig. 13, will be substantially reversed relative to the unit 57, Fig. 14, and the hook units 48 and 49 will rock away from one another into the dash and dot line position shown in Fig. 11 and toward one another into the full line position shown in Fig. 11. To rock the plates 58 and 59 and with them the hook units 48 and 49 from the full line position into the dash and dot line position shown in Fig. 11, it will first be necessary to free the plates 58 and 59 from the pins 60 and 61 respectively. For this purpose there are disclosed two actuating means. As an instance, the handle 62 connected to the shaft 63 supported by the plates 54 and 55 will have fixed to it the two armed lever 64 having the arms 65 and 66, the arm 65 being connected by the line or lanyard 67 to the upper right hand corner or edge 68 of the plate 58 and the end of the arm 66 being connected by the line or lanyard 69 to the upper left hand corner 70 of the plate 59. If, in the position where the plates 58 and 59 are in anchoring relation to the pins 60 and 61 respectively, Fig. 14, then the arm 65 will extend in a westerly direction and the arm 66 will extend in an easterly direction and it will be necessary for the lever 62 to be rotated in a clockwise direction, in the direction of the arrow 71 in order to rock the plates 58 and 59 toward one another to clear the pins 60 and 61 respectively. Thereupon, the hook units 48 and 49 will first be raised so that their pins 72 and 73 will ride into the upper ends of the recesses 74 and 75 respectively formed in the plates 54 and 55 respectively, when the lips 76 and 77 will clear the pins 78 and 79 and permit the hook units 48 and 49 to be rocked upwardly into the dash and dot line position, Fig. 11. When the hook units 48 and 49 are raised into their open or loading position, they will then be in position to enable their pins 60 and 61 to drop into the recesses 80 and 81 where the hook units 48 and 49 will be anchored or locked in open or loading position. In turn when it is desired then to release the hook units 48 and 49 to return into their lock plate or load carrying position, it will only be necessary to raise the hook units 48 and 49 to enable their pins 60 and 61 to clear the recesses 80 and 81 respectively when under their own weight the hook units 48 and 49 will be permitted to drop down into lock plate or load carrying position, that is, the full line position shown in Fig. 11 where the lips 76 and 77 will engage the pins 78 and 79, the pins 60 and 61 will enter the recesses 82 and 83 respectively and the pins 72 and 73 will drop to the bottom of the recesses 74 and 75 in the plates 54 and 55.

Instead of the lever 62 and lanyards 67 and 69, electro magnets 84 and 85 may be mounted on the plate 54 in position to attract the corners 68 and 70 of the plates 58 and 59 when energized in turn to rock the plates 58 and 59. These electro magnets 84 and 85 may be connected by suitable wiring 86 and 87 respectively which may be passed up to the lifting cable 88 and along it up to the station where the operator is located. Furthermore as shown in Fig. 11, lanyards 89 and 90 may be connected to the fins 91 and 92 formed on the hook units 48 and 49 respectively which lanyards 89 and 90 pass over the rollers 93 and 94 respectively to the roller 95 from which they pass upwardly and are connected as a common lanyard or line 96 which extends up to the station where the operator is located. The lanyards 89 and 90 are used to swing the hook units 48 and 49 upwardly from the full line position to the dotted line position shown in Fig. 11. There are also provided the lanyards 97 and 98 which are connected at 99 and 100 to the fins 91 and 92 respectively, which lanyards 97 and 98 also pass over the rollers 93 and 94 respectively and then under the roller 95 and then are connected to one another as the common lanyard 101 which extends up with the lanyard 96 to the station where the operator is located. The lanyard 101 and with it the lanyards 97 and 98, are used to raise the hook units 48 and 49 out of anchoring position with the recesses 80 and 81 of the plates 58 and 59 respectively.

As shown in Figs. 1 and 2, the hook unit 14 is provided with a nose or projection 102 extending inwardly from the hook 13 to prevent the accidental removal of a hawser or lanyard positioned in the hook unit 14 when being loaded. The hook units 48 and 49 of the embodiment illustrated in Figs. 11–14, inclusive, may obviously be equipped with similar projections without departing from the general spirit of the invention.

Instead of the electro magnet 46 at the right hand side of the bar 1 to receive and rock the plate 26 so that its recess 37 will clear the pin 18, this plate 26, see the modification illustrated in Fig. 15, may also be actuated by remote control to wit, by a lanyard, such as the lanyard 103 which is connected to the upper right hand end of the plate 26 and then passes under the roller 104 on the pin 105 and from the roller 104 extends to and over the roller 23 to the station where the operator is located for actuation of the plate 26 by remote control.

It is of course obvious that both the hook unit of the embodiment illustrated in Figs. 1 and 2 and the hook units of the embodiment illustrated in Figs. 11 to 14 inclusive may be manipulated by hand without the lanyards or electro magnets illustrated for manipulating these devices by remote control.

It is obvious that various changes and modifications may be made to the details of construction without departing from the general spirit of the invention as set forth in the appended claims.

I claim:

1. A cargo hook having two side bars in alinement with, and spaced from, one another, a first pin connecting the upper end of said bars to one another and adapted to receive a main hawser, a second pin connecting the lower ends of said bars, there being longitudinally extending slots in said bars in alinement with one another and intermediate said first and second pins, a third pin extending through said slots and slidably mounted in the same, an arcuate hook unit having one end pivotally connected to said third pin, an outwardly extending lip at the other end of said hook unit resting upon said second pin when said third pin rests on said bars at the lower ends of said slots in load carrying position, and a fourth pin connecting said bars between said second pin and said longitudinally extending slots, there being a recess on the inside of said one end of said hook unit to receive said fourth pin in load carrying position of said hook unit.

2. A cargo hook as set forth in claim 1 having an anchoring plate pivotally mounted on said fourth pin, said plate having a main slot receiving said third pin, there being an upper recess and a lower recess in said plate, and a hook pin extending from the upper end of said hook unit, said upper recess receiving said hook pin in open or loading position of said hook unit and said lower recess receiving said hook pin in closed or load carrying position of said hook unit.

3. A cargo hook as set forth in claim 1 having an anchoring plate pivotally mounted on said fourth pin, said plate having a main slot receiving said third pin, there being an upper recess and a lower recess in said plate, a hook pin extending from the upper end of said hook unit, said upper recess receiving said hook pin in open or loading position of said hook unit and said lower recess receiving said hook pin in closed or load carrying position of said hook unit, said main slot having a lower lateral recess, and a spring for urging said plate laterally to enable said hook pin to enter said lower recess and said third pin to enter said lateral recess when said hook unit is lowered into load carrying position.

4. A cargo hook as set forth in claim 1 having an anchoring plate pivotally mounted on said fourth pin, said plate having a main slot receiving said third pin, there being an upper recess and a lower recess in said plate, a hook pin extending from the upper end of said hook unit, said upper recess receiving said hook pin in open or loading position of said hook unit and said lower recess receiving said hook pin in closed or load carrying position of said hook unit, said main slot having a lower lateral recess, a spring for urging said plate laterally to enable said hook pin to enter said lower recess and said third pin to enter said lateral recess when said hook unit is lowered into load carrying position, a fifth pin connecting said bars intermediate said first pin and the slots in said bars, there being a first opening near the upper end of said hook unit, there being a second opening spaced from and below said first opening, a first lanyard extending through said first opening and there connected to said hook unit and then extending up over said fifth pin, and a second lanyard extending through said second opening and there connected to said hook unit and then extending up over said fifth pin, a pull on said first lanyard when said hook pin is disposed in said upper recess raising said hook unit to clear said upper recess and permit said hook unit to descend into its load carrying position, and a pull on said second lanyard when said hook pin is disposed in said lower recess and said plate is rocked against the tension of said spring to clear said hook pin raising said hook unit into open position where said hook pin will be free to drop into said upper recess to anchor said hook unit in open position.

5. A cargo hook as set forth in claim 1 having an anchoring plate pivotally mounted on said fourth pin, said plate having a main slot receiving said third pin, there being an upper recess and a lower recess in said plate, a hook pin extending from the upper end of said hook unit, said upper recess receiving said hook pin in open or loading position of said hook unit and said lower recess receiving said hook pin in closed or load carrying position of said hook unit, said main slot having a lower lateral recess, a spring for urging said plate laterally to enable said hook pin to enter said lower recess and said third pin to enter said lateral recess when said hook unit is lowered into load carrying position, a fifth pin connecting said bars intermediate said first pin and the slots in said bars, a roller on said fifth pin, there being a first opening near the upper end of said hook unit, there being a second opening spaced from and below said first opening, a first lanyard extending through said first opening and there connected to said hook unit and then extending up over said roller, and a second lanyard extending through said second opening and there connected to said hook unit and then extending up over said roller, a pull on said first lanyard when said hook pin is disposed in said upper recess raising said hook unit to clear said upper recess and permit said hook unit to descend into its load carrying position, and a pull on said second lanyard when said hook pin is disposed in said lower recess and said plate is rocked against the tension of said spring to clear said hook pin raising said hook unit into open position where said hook pin will be free to drop into said upper recess to anchor said hook unit in open position.

6. A cargo hook having two side bars in alinement with and spaced from, one another, a first pin connecting the upper end of said bars to one another, a first roller on said first pin adapted to receive a main hawser, a second pin connecting the lower ends of said bars, there being longitudinally extending slots in said bars in alinement with one another and intermediate said first and second pins, a third pin extending through said slots and slidably mounted in the same, an arcuate hook unit having one end pivotally connected to said third pin, a second roller on said second pin, an outwardly extending lip at the other end of said hook unit resting upon said second roller when said third pin rests on said bars at the lower ends of said slots in load carrying position, and a fourth pin connecting said bars between said second pin and said longitudinally extending slots, there being a recess on the inside of said one end of said hook unit to receive said fourth pin in load carrying position of said hook unit.

7. A cargo hook having two side bars in alinement with and spaced from, one another, a first pin connecting the upper end of said bars to one another and adapted to receive a main hawser, a second pin connecting the lower ends of said bars, there being longitudinally extending slots in said bars in alinement with one another and intermediate said first and second pins, a third pin extending through said slots and slidably mounted in the same, an arcuate hook unit having one end pivotally connected to said third pin, an outwardly extending lip at the other end of said hook unit resting upon said second pin when said third pin rests on said bars at the lower ends of said slots in load carrying position, a fourth pin connecting said bars between said second pin and said longitudinally extending slots, there being a recess on the inside of said one end of said hook unit to receive said fourth pin in load carrying position of said hook unit, an anchoring unit having a first plate fixed to the inside of one of said bars and a second plate pivotally mounted upon said fourth pin adjacent the inner face of the other of said bars, said plates having main slots in alinement with one another receiving said third pin, there being an upper recess and a lower recess in said second plate, a third recess in said first plate in alinement with said upper recess, hook pin portions extending from the opposite faces of the upper end of said hook unit, said third recess and said upper recess receiving said pin portions in open or loading position of said hook unit, and said lower recess receiving one of said pin portions in closed or load carrying position of said hook unit.

8. A cargo hook as set forth in claim 1 characterized by the main slot in said second plate having a lower lateral recess, and a spring for urging said second plate laterally to enable one of said hook pin portions to enter said lower slots and said third pin to enter said lateral recess when said hook unit is lowered into load carrying position.

9. A cargo hook having two side bars in alinement with and spaced from, one another, a first pin connecting the upper end of said bars to one another and adapted to receive a main hawser, a second pin connecting the lower ends of said bars, there being longitudinally extending slots in said bars in alinement with one another and intermediate said first and second pins, a third pin extending through said slots and slidably mounted in the same, an arcuate hook unit having one end pivotally connected to said third pin, an outwardly extending lip at the other end of said hook unit resting upon said second pin when said third pin rests on said bars at the lower ends of said slots in load carrying position, a fourth pin connecting said bars between said second pin and said longitudinally extending slots, there being a recess on the inside of said one end of said hook unit to receive said fourth pin in load carrying position of said hook unit, an anchoring unit having a first plate and a second plate, a fifth pin and said fourth pin fixedly connecting said first plate to said bars, said second plate pivotally mounted upon said fourth pin, said plates having common slots for receiving said third pin, there being an upper recess and a lower recess in said second plate, a third recess in said first plate in alinement with said upper recess, and hook pin portions extending from the opposite faces of the upper end of said hook unit, said upper recess and said third recess receiving said pin portions in open or loading position of said hook unit and said lower recess receiving one of said pin portions in closed or load carrying position of said hook unit.

10. A cargo hook as set forth in claim 9 characterized by the main slot in said second plate having a lower lateral recess, and a spring for urging said second plate laterally to enable one of said hook pin portions to enter said lower recess and said third pin to enter said lateral recess when said hook unit is lowered into load carrying position.

11. A cargo hook as set forth in claim 9 characterized by the main slot in said second plate having a lower lateral recess, a spring for urging said second plate laterally to enable one of said hook pin portions to enter said lower recess and said third pin to enter said lateral recess when said hook unit is lowered into load carrying position, and a finger piece at the upper end of said second plate to be engaged and rock said second plate to clear the pin portion in said lower recess when said hook unit is in load carrying position to enable rocking said hook unit up into open position.

12. A cargo hook as set forth in claim 9 characterized by the main slot in said second plate having a lower lateral recess, a spring for urging said second plate laterally to enable one of said hook pin portions to enter said lower recess and said third pin to enter said lateral recess when said hook unit is lowered into load carrying position, and an electro magnet mounted upon one of said bars adjacent the upper end of said second plate and adapted when energized to rock said second plate to clear the pin portion out of said lower recess in turn to enable the hook unit to be raised into open position.

13. A cargo hook as set forth in claim 9 characterized by the main slot in said second plate having a lower lateral recess, a spring for urging said second plate laterally to enable one of said hook pin portions to enter said lower recess and said third pin to enter said lateral recess when said hook unit is lowered into load carrying position, a sixth pin on said bars, and a lanyard extending from the upper end of said second plate to and around said sixth pin and then to the operator to enable a pull on said lanyard to rock said second plate to clear the pin portion out of said lower recess in turn to enable the hook unit to be raised into open position.

14. The combination of two main plates in alinement with one another and spaced from one another, two arcuate cargo hook units disposed at the ends of said two main plates and facing one another, a first set of pins pivotally connecting said hook units to said plates to facilitate rocking the hook units upwardly into open position and downwardly into load carrying position, anchoring devices operatively connecting said hook units to said main plates in open position and in closed position, a supporting bracket pivotally connected to the upper middle ends of said plates and adapted to receive a hawser, a remote control having a second set of pins mounted on said plates and a first set of lanyards connected to, and extending from, said hook units to and around said second set of pins and then to the operator to enable rocking the hook units into and out of closed position, said remote control also having an actuating lever, a second set of lanyards connecting said anchoring devices to said lever, and a third set of lanyards connected to, and extending from said lever to the operator to enable actuating said anchoring devices into and out of anchoring position.

15. The combination of two main plates in alinement with one another and spaced from one another, two arcuate cargo hook units disposed at the ends of said two main plates and facing one another, a first set of pins pivotally connecting said hook units to rock upwardly into open position and downwardly into closed position, said hook units having recesses at their inner upper ends and lips at their outer free ends, a second set of pins for each hook unit mounted on said plates to receive the recesses and lips of said hook units in closed position, anchoring devices for anchoring said hook units in open position and in closed position, a lever mounted on one of said plates, and lanyards connecting said lever to said anchoring means to enable actuation of said lever in turn to actuate said anchoring means to release said cargo hook units for actuation into open position.

16. The combination of two main plates in alinement with one another and spaced from one another, two arcuate cargo hook units disposed at the ends of said two main plates and facing one another, a first set of pins pivotally connecting said hook units to said plates to facilitate rocking the hook units upwardly into open position and downwardly into load carrying position, anchoring devices operatively connecting said hook units to said main plates in open position and in closed position, a supporting bracket pivotally connected to the upper middle ends of said plates and adapted to receive a hawser, a first remote control having means for actuating said anchoring devices to liberate said hook units when in load carrying position, and a second remote control for actuating said hook units out of load carrying position.

17. The combination of two main plates in alinement with one another and spaced from one another, two arcuate cargo hook units disposed at the ends of said two main plates and facing one another, there being a pair of sets of longitudinally extending slots in said plates, the slots of each set being in alinement with one another, a first pin extending through one end of each of said hook units and in turn extending through one set of said slots and slidably mounted in such set of slots, an outwardly extending lip at the other end of each of said hook units, a second pin for each of said hook units mounted in said plates and receiving the lip of said latter hook unit when the first pin of said latter hook unit rests on said plates at the lower ends of a pair of said slots in load carrying position, and a third pair of pins each connecting said plates above one pair of said longitudinally extending slots, there being a recess on the inside of said one end of each of said hook units to receive a pin of said third set in load carrying position of said hook units.

18. A cargo hook having a clevis having two side bars in alinement with, and spaced from, one another, an arcuate hook unit floatingly mounted in said clevis, a first pin connecting the side bars of said clevis and a second pin connecting the side bars of said clevis below said first pin, said hook unit having a recess on the inside of its upper end to receive said first pin, and a lip at its lower end to receive said second pin in load carrying position, and means for raising said hook unit relative to said clevis out of engagement with said pins and rocking same into open position.

References Cited in the file of this patent

UNITED STATES PATENTS

| | | |
|---|---|---|
| 2,462,965 | Henderson | Mar. 1, 1949 |
| 2,595,450 | Coffing | May 6, 1952 |
| 2,666,664 | Johnson | Jan. 19, 1954 |